(No Model.)
C. R. HUSSEY.
SPLIT PULLEY.
No. 392,269. Patented Nov. 6, 1888.
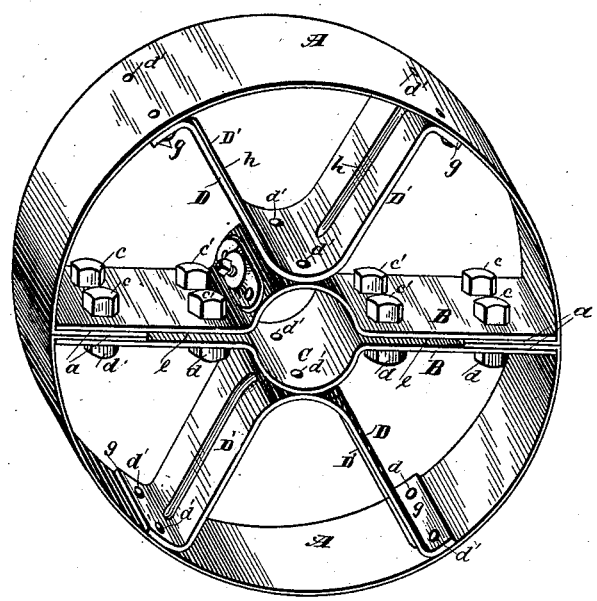
Witnesses:
Wm. M. Monroe.
Irene L. Corey.
Inventor.
Charles R. Hussey.
by
H. T. Fisher,
Attorney.

UNITED STATES PATENT OFFICE.

CHARLES R. HUSSEY, OF CLEVELAND, OHIO, ASSIGNOR OF ONE-HALF TO GEORGE A. FORD, OF SAME PLACE.

SPLIT PULLEY.

SPECIFICATION forming part of Letters Patent No. 392,269, dated November 6, 1888.

Application filed May 7, 1888. Serial No. 273,023. (No model.)

*To all whom it may concern:*

Be it known that I, CHARLES R. HUSSEY, a citizen of the United States, residing at Cleveland, in the county of Cuyahoga and State of Ohio, have invented certain new and useful Improvements in Split Pulleys; and I do hereby declare that the following is a full, clear, and exact description of the invention, which will enable others skilled in the art to which it appertains to make and use the same.

My invention relates to improvements in split pulleys; and it consists in a pulley made wholly of sheet metal, and constructed substantially as shown and described, and especially pointed out in the claims.

In the drawing I show a perspective view of my improved pulley, in which A indicates the band, formed in two separate and distinct parts, and having the ends $a$ of each part bent inward sharply, substantially at right angles, so that no perceptible break will occur in the periphery of the pulley when the parts or sections of the band are united. On the line of the split are two plates, B B, arranged face to face, and having their central portion bent outward to form a hub, C, for the shaft. These plates are shown as provided with two sets of screw-bolts, $c$ $c'$, having nuts $d$, the bolts $c$ passing through the plates B B near their ends and through the inwardly-bent ends $a$ of the band-sections A, said ends terminating, say, half-way the length of said plates on either side of the hub and clamped firmly between the plates by the bolts and nuts $c$ $d$. This arrangement of the ends $a$ of the band-sections with respect to the plates B B leaves an open space, $e$, between said plates and the hub equal to the thickness of said ends. The bolts $c'$ are set on either side of the hub and serve to clamp the hub upon the shaft. It need scarcely be suggested that sectional wooden or other suitable bushing will be employed in the hub, and when this is put in place the nuts $c'$ will be tightened, so as to clamp the hub firmly upon the shaft, the open space $e$ between the plates B B providing even more room than is necessary for this purpose.

On opposite sides of the hub C and on each side thereof I form two arms, D', by bending a piece of sheet metal, D—say of the width of the band—to a substantially V form and attach the said piece to the hub and the band, respectively, by countersunk rivets $d'$, the arms of the piece being spread and having their ends $g$ bent in opposite directions to lie against the inside of the band and form a firm connection therewith. To strengthen said arms a bead, $h$, is formed longitudinally in the piece D. In case the ends $a$ of the band are extended inward to the hub instead of stopping half-way, the sections of the pulley would be clamped as firmly as possible upon the shaft, and then the pulley might be secured in addition in any well-known way. The band may be flat or crowning and with or without side flanges. It will be seen that the entire pulley is made of sheet metal, and the several parts are so shaped that the work of manufacture can be quickly and easily performed without expensive machinery or specially skilled labor. This insures a cheap pulley in so far as material and make-up are concerned, and with the additional advantage of being exceedingly light—weighing, say, not more than half as much as a wooden pulley of the same dimensions—the finished article must combine the advantages of cheapness and utility in a marked degree.

Obviously the arms D' on the opposite sides of the hub may be made of separate pieces instead of a single piece bent to form two arms, as shown, and one or more bolts may be employed to clamp the hub-sections together according to the width of the band.

It should have been mentioned that the ends of the clamping-pieces B B abut against the inside of the band at the angle formed by the bent ends $a$, and the parts being bolted together, as described, a very firm union thereof and a perfect bracing of the band are obtained.

Having thus described my invention, what I claim as new, and desire to secure by Letters Patent, is—

1. A split pulley having the band formed in two sections with the ends of each section bent inward toward the axial center of the pulley, and two clamping-pieces forming the hub of the pulley and having the ends of the band-sections secured between them, substantially as set forth.

2. In a pulley formed of sheet metal, a pair of clamping-plates placed face to face and having half of the hub formed in each, sectional band-pieces having their ends bent inward at sharp angles and resting between the ends of the clamping-plates, and bolts for clamping the parts firmly together, substantially as set forth.

3. In a sectional sheet-metal pulley, a pair of clamping-plates arranged face to face, and band-pieces having their ends bent and extending inward part way between the periphery of the band and the hub and between said clamping-plates, whereby an open space is left between said plates beyond the ends of the band-pieces, substantially as set forth.

4. A pulley formed of sheet metal and consisting of the following parts: a pair of clamping-plates having half of the hub formed in each, band-pieces having their ends secured between said plates, and arms on the opposite sides of the hub formed by bending a piece of sheet metal to a substantially V form and riveted to the band and hub, substantially as set forth.

CHARLES R. HUSSEY.

Witnesses:
H. T. FISHER,
I. S. COREY.